(12) United States Patent
Edwards et al.

(10) Patent No.: US 8,752,171 B2
(45) Date of Patent: Jun. 10, 2014

(54) BEHAVIORAL TRACKING SYSTEM, METHOD, AND COMPUTER PROGRAM PRODUCT FOR UNDOING EVENTS BASED ON USER INPUT

(75) Inventors: Jonathan L. Edwards, Portland, OR (US); Joel R. Spurlock, Newberg, OR (US); Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 218 days.

(21) Appl. No.: 12/876,037

(22) Filed: Sep. 3, 2010

(65) Prior Publication Data

US 2013/0276107 A1    Oct. 17, 2013

(51) Int. Cl.
*G06F 11/00*    (2006.01)

(52) U.S. Cl.
USPC .................... 726/22; 726/23; 726/24; 726/25

(58) Field of Classification Search
CPC ..... G06F 21/56; G06F 21/562; G06F 21/564; G06F 21/566; G06F 21/55; G06F 21/554; G06F 21/568
See application file for complete search history.

(56) References Cited

U.S. PATENT DOCUMENTS

| | | | |
|---|---|---|---|
| 2006/0005148 A1* | 1/2006 | Cheng et al. | 715/808 |
| 2007/0300178 A1* | 12/2007 | McArdle | 715/781 |
| 2008/0208858 A1* | 8/2008 | Kim et al. | 707/6 |
| 2011/0083176 A1* | 4/2011 | Martynenko et al. | 726/13 |
| 2011/0246936 A1* | 10/2011 | Stahlberg | 715/809 |
| 2012/0079596 A1* | 3/2012 | Thomas et al. | 726/24 |

OTHER PUBLICATIONS

U.S. Appl. No. 12/177,601, filed Jul. 22, 2008.
U.S. Appl. No. 12/202,952, filed Sep. 2, 2008.
U.S. Appl. No. 11/749,635, filed May 16, 2007.
U.S. Appl. No. 12/111,851, filed Apr. 29, 2008.
U.S. Appl. No. 12/415,641, filed Mar. 31, 2009.

* cited by examiner

*Primary Examiner* — Nirav B Patel
*Assistant Examiner* — Mohammed Waliullah
(74) *Attorney, Agent, or Firm* — Wong, Cabello, Lutsch, Rutherford & Brucculeri, LLP

(57) ABSTRACT

A behavioral tracking system, method, and computer program product are provided for undoing events based on user input. In use, a plurality of unclassified events is identified on a system utilizing behavioral tracking. Additionally, input associated with at least one of the unclassified events is received from a user of the system for classifying the at least one of the unclassified events as an unwanted event. Further, the at least one unwanted event is undone in response to the receipt of the input.

17 Claims, 8 Drawing Sheets

BEHAVIORAL TRACKING SYSTEM, METHOD, AND COMPUTER PROGRAM PRODUCT FOR UNDOING EVENTS BASED ON USER INPUT

FIELD OF THE INVENTION

The present invention relates to behavioral tracking on computer systems, and more particularly to undoing events identified utilizing behavior tracking.

BACKGROUND

Traditionally, behavioral tracking has included the tracking of events identified via behavioral analysis of computer systems. The behavioral tracking is generally utilized to identify such events for the purpose of classifying the events as unwanted, malicious, etc. Unfortunately, techniques utilized by conventional behavioral tracking systems to classify events have been limited. For example, such techniques have typically been solely automated, such that a user is prevented from controlling when and/or how an event is classified, or solely manual, such that the user is required to manually classify each event.

Moreover, techniques for handling events classified as unwanted have also exhibited various limitations. For example, if a user desires to undo an event, the user has generally been limited to utilizing a system restore point, which results in all events occurring after the restore point being undone. There is thus a need for addressing these and/or other issues associated with the prior art.

SUMMARY

A behavioral tracking system, method, and computer program product are provided for undoing events based on user input. In use, a plurality of unclassified events is identified on a system utilizing behavioral tracking. Additionally, input associated with at least one of the unclassified events is received from a user of the system for classifying the at least one of the unclassified events as an unwanted event. Further, the at least one unwanted event is undone in response to the receipt of the input.

DETAILED DESCRIPTION

Figure 1:
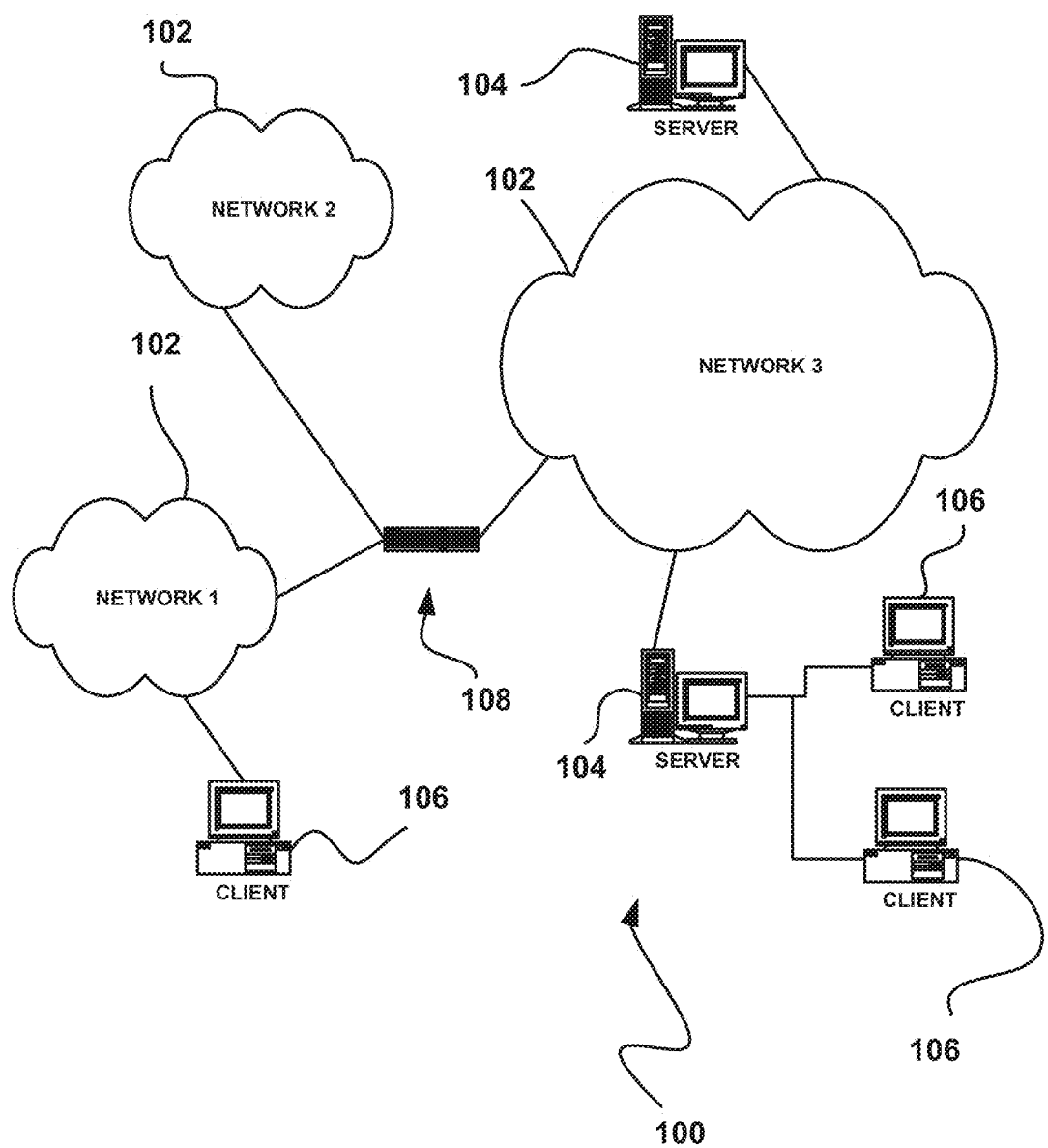
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
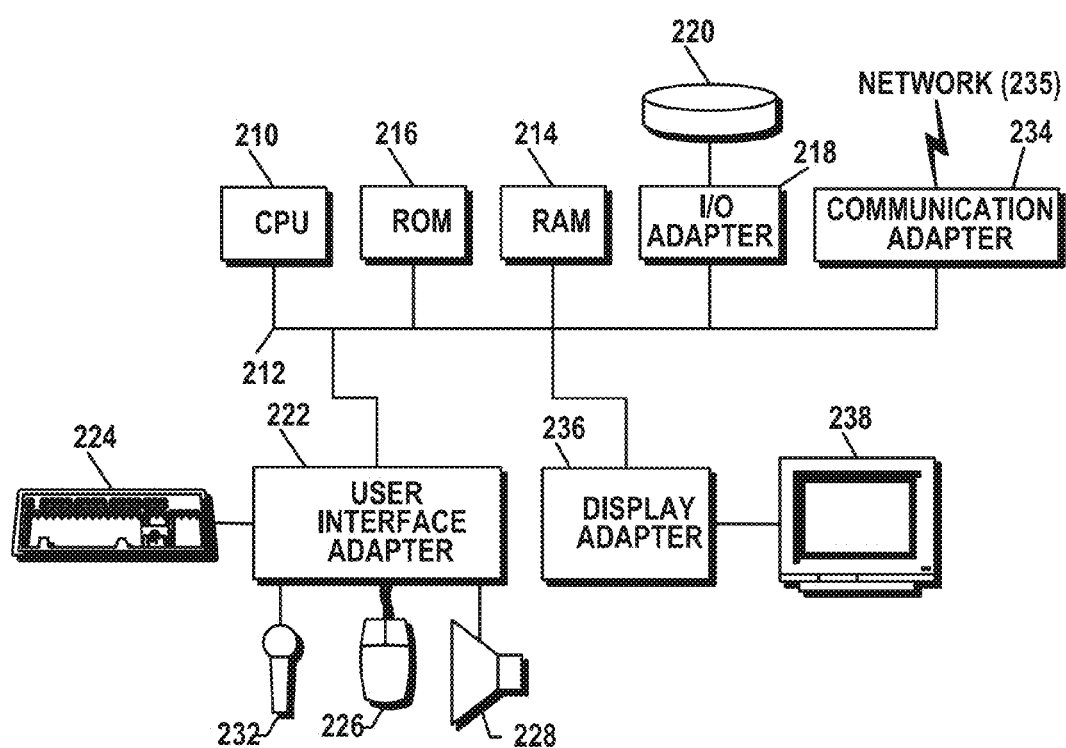
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
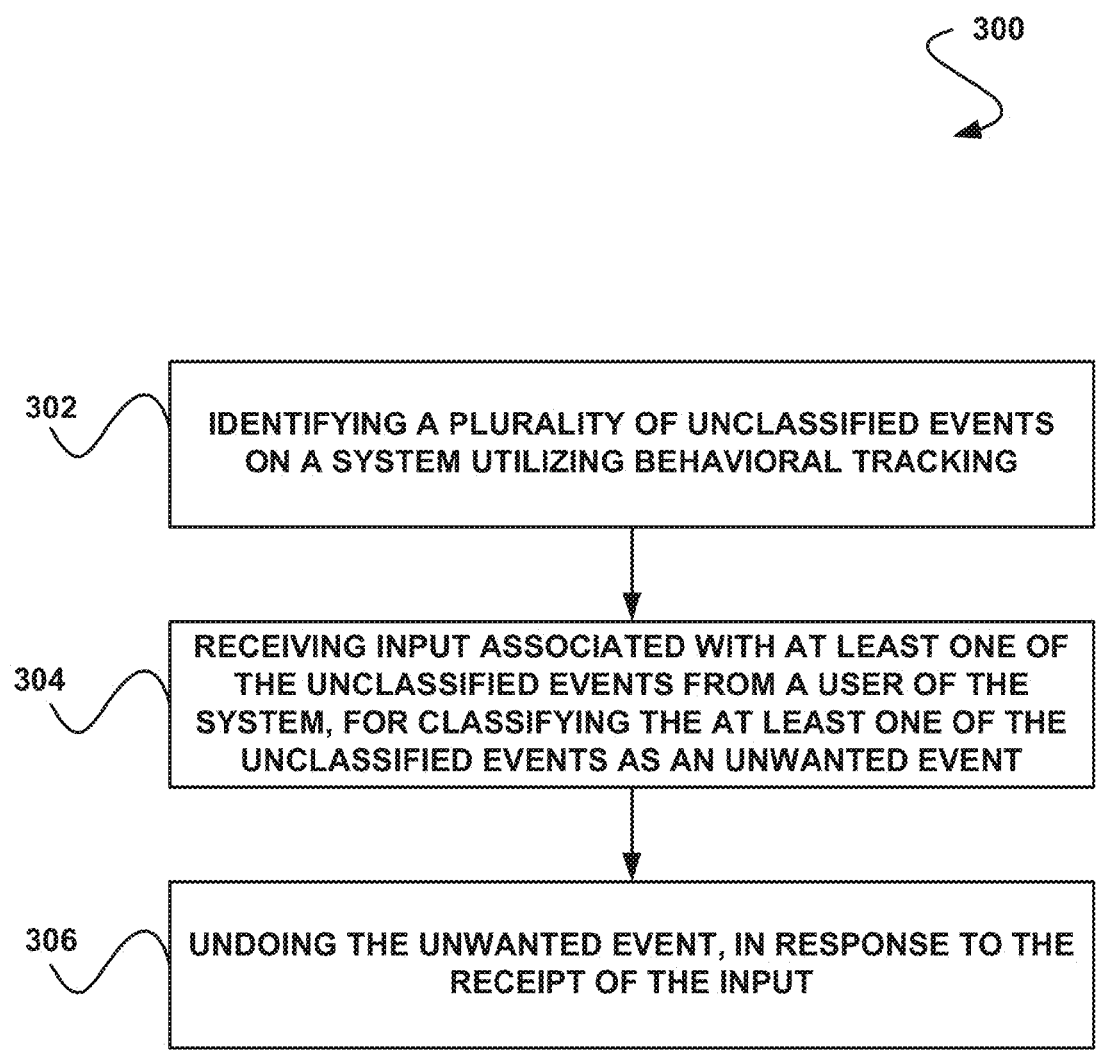
FIG. 3 shows a behavioral tracking method for undoing events based on user input, in accordance with another embodiment.

FIG. 3 shows a behavioral tracking method 300 for undoing events based on user input, in accordance with another embodiment. As an option, the method 300 may be carried out in the context of the architecture and environment of FIG. 1 and/or 2. Of course, however, the method 300 may be carried out in any desired environment.

As shown in operation 302, a plurality of unclassified events is identified on a system utilizing behavioral tracking. With respect to the present description, the behavioral tracking includes any behavioral analysis performed with respect to the system for identifying (e.g. and thus tracking) events on the system. For example, the behavioral tracking may include analyzing behaviors (e.g. activities, etc.) of the system to identify the unclassified events.

It should be noted that the system for which the behavioral tracking is performed may include an endpoint (e.g. user) computer, server, or network of devices. Further, the behavioral tracking may be performed by the system or, in another embodiment, by a remote system capable of performing a behavioral analysis with respect to the system. To this end, the unclassified events may be identified by the system or by a remote system.

As noted above, the unclassified events which are identified may include any events identified utilizing the behavioral tracking. In one embodiment, such events may include accessing (e.g. opening, reading, writing, copying, installing, downloading, receiving, etc.) content, such as files, applications, web pages, or other computer code. In another embodiment, the events may include executing code (e.g. applications, etc.). It should be noted that the events may be user initiated or automatically initiated (e.g. without user action).

Furthermore, the events may be unclassified such that the events are not yet classified as either wanted or unwanted. For example, it may not yet be determined whether the events are malicious, harmful, associated with malware, etc. Accordingly, the events may include all events occurring on the system which are identified utilizing the behavioral tracking.

Additionally, as shown in operation 304, input associated with at least one of the unclassified events is received from a user of the system for classifying the at least one of the unclassified events as an unwanted event. For example, as described in more detail below, the user may determine that a particular one (or more) of the unclassified events is an unwanted event (e.g. is a malicious event, is associated with malware, etc.), or that a symptom (e.g. result, consequence, etc.) associated with at least one of the unclassified events is unwanted, such that the associated unclassified event(s) is unwanted.

In one embodiment, the input may include a selection of the at least one of the unclassified events. Optionally, such selection may be received utilizing a list of the unclassified events (e.g. which is displayed to the user), but of course may also be received utilizing any other presentation of the unclassified events to the user. As another option, the list of unclassified events may include (e.g. may be limited to) at least a portion of the unclassified events which have been identified within a predetermined amount of time (e.g. within a day, a week, or any other preconfigured period of time), such that the amount of unclassified events from which the user may select is limited based on the time during which such events were identified on the system.

In another embodiment, the list of the unclassified events may be displayed to the user in response to a user request to view the list of the unclassified events. Thus, the user may initiate the generation and subsequent presentation of the list of unclassified events by issuing the aforementioned user request. As an option, the user request may be received in response to the user selecting a preconfigured option from a drop down menu displayed upon selection by the user of an icon on a task bar.

In yet another embodiment, the input may include a selection by the user associated with (or otherwise of) a symptom resulting from at least one of the unclassified events. Thus, the symptom may include a particular behavior of the system (e.g. which is capable of being identified as resultant from at least one of the unclassified events). Just by way of example, the symptom may include one or more pop-up windows, a reduction in a speed of network traffic, a reduction in a speed of a browser, a reduction in a speed of processing capabilities of the system, a process running on the system, etc.

Thus, as noted above, the user input may be associated with a symptom identified with respect to the system such that at least one of the unclassified events determined to be associated with such symptom (e.g. determined to be source of the symptom) is classified as an unwanted event. As an option, at least one of the identified unclassified event(s) may be automatically determined to be associated with the symptom (e.g. based on an automated analysis of the symptom and/or unclassified events).

As another option, unclassified event(s) may be manually determined to be associated with the symptom. For example, the user may manually correlate at least one of the identified unclassified event(s) with the symptoms. Such correlation may be provided by presenting the user with a list of the unclassified events capable of being associated with the symptom (e.g. as determined from an analysis), and the user selecting one of the unclassified events in the list.

To this end, the unclassified event(s) may be associated with the user input in any desired manner, for classifying the same unwanted. In one embodiment, the unclassified event(s) associated with the user input may be automatically classified as an unwanted event (e.g. by automatically determining the unclassified event(s) to be correlated with a user selected symptom of the system, as described above). In another embodiment, the unclassified event(s) associated with the user input may be manually classified as an unwanted event (e.g. by the user selecting such unclassified event(s), as described above).

Further, the at least one unwanted event is undone in response to the receipt of the input, as shown in operation 306. With respect to the present description, undoing the unwanted event may include putting the system in a state as if the unwanted event had never occurred. For example, the unwanted event may be undone by rolling back an action performed by the system which resulted in the occurrence of the event (e.g. accessing content, executing code, etc.).

In one embodiment, only the unwanted event may be undone. In this way, other events that occurred subsequent to the occurrence of the unwanted event may be prevented from being undone. For example, the unwanted event may be undone by determining a history of actions (e.g. operations, functions, etc.) that were executed by the system which resulted in or other consisted of the unwanted event, and undoing each of such actions (e.g. in an order reversed from the order in which they occurred). One example of determining the aforementioned history of events for using the same to undo an action is described in U.S. patent application Ser. No. 12/177,601, filed Jul. 22, 2008, and entitled "System, Method, And Computer Program Product For Utilizing A Data Structure Including Event Relationships To Detect Unwanted Activity," which is herein incorporated by reference in its entirety. As another option, the unwanted event may be undone in the manner described with respect to U.S. patent application Ser. No. 12/202,952, filed Sep. 2, 2008, and entitled "Behavioral Analysis System, Method, And Computer Program Product For Propagating Events Over A Plurality Of Hierarchical Levels Of Processing," which is incorporated herein by reference in its entirety.

Moreover, the unwanted event may be automatically undone, in response to the receipt of the user input. For example, the unwanted event may be automatically undone by an infrastructure providing the behavioral tracking. To this end, behavioral tracking may be used in combination with user input for undoing unwanted events occurring on a system. By combining the user input with the behavioral tracking, events which have been identified utilizing the behavioral tracking but not yet been classified based solely on the behavioral tracking may be classified as unwanted (and thus undone) based on the user input.

Just by way of example, a user may determine that a symptom of the system is unwanted, but may be unaware of the particular event that occurred on the system which resulted in the unwanted symptom. However, the behavioral tracking may be utilized to identify events that occurred on the system. Thus, in one embodiment, it may be automatically determined which of those events resulted in the unwanted symptom, such that in response to user input indicating the unwanted symptom, the event which is the source of the unwanted symptom may be identified and undone. In another embodiment, the identified events may be presented to the user, such that the user may manually determine which event is the source of the unwanted symptom and may select such event for undoing the same.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
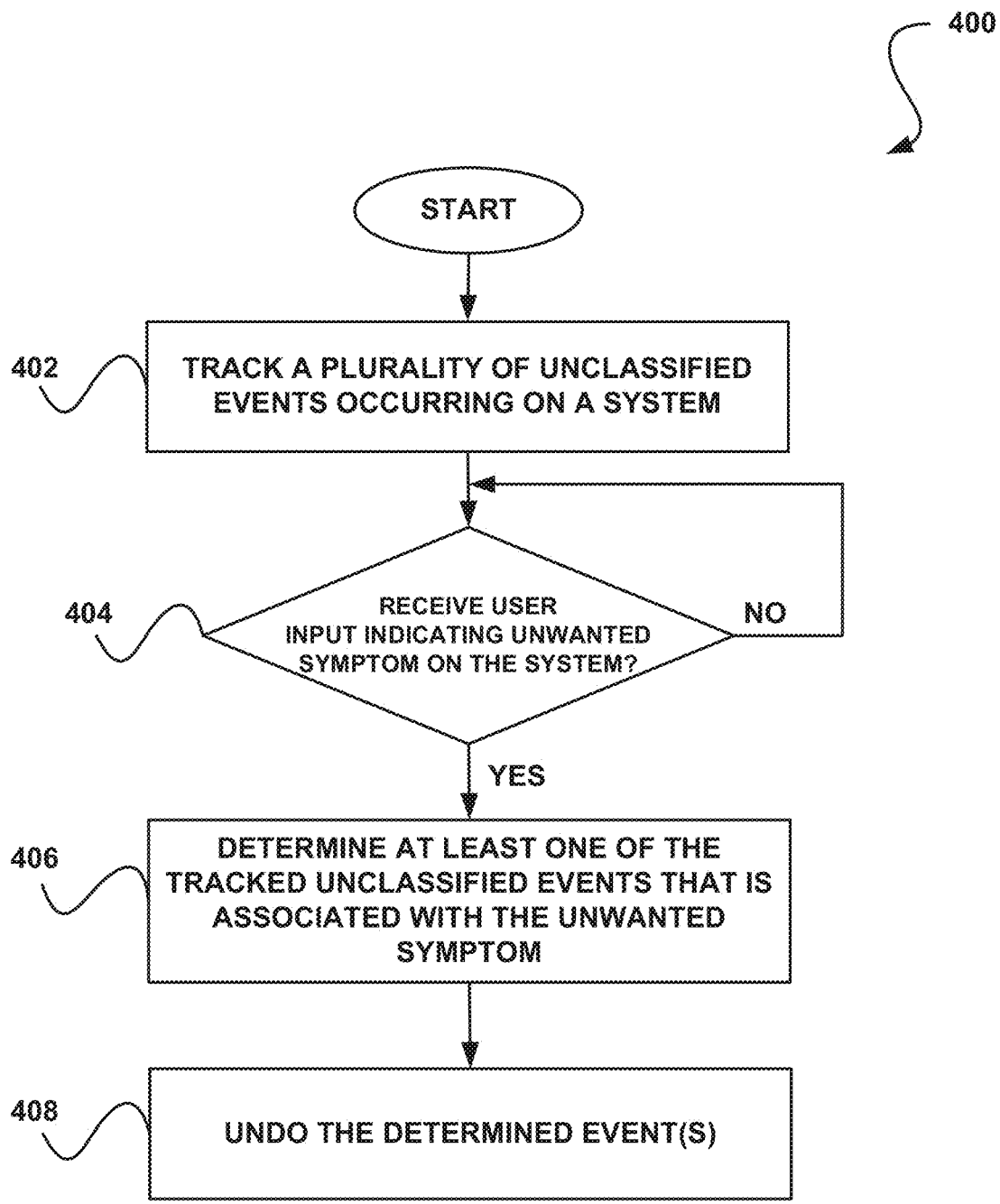
FIG. 4 shows a behavioral tracking method for undoing events associated with symptoms on a system identified by a user as unwanted, in accordance with yet another embodiment.

FIG. 4 shows a behavioral tracking method 400 for undoing events associated with symptoms on a system identified by a user as unwanted, in accordance with yet another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, a plurality of unclassified events occurring on a system is tracked. With respect to the present embodiment, the unclassified events are tracked utilizing behavioral tracking performed with respect to the system. For example, the unclassified events may be tracked by identifying (e.g. and logging, etc.) events occurring on the system without necessarily classifying such events.

In addition, as shown in decision 404, it is determined whether user input has been received indicating that a symptom on the system is unwanted. In one embodiment, the input may include the user selecting a symptom on the system for indicating that such symptom is unwanted. Just by way of example, where the symptom includes a process running on the system, such user input may include user selection associated with a process running on the system (e.g. utilizing a displayed list of processes, such as via a task manager window of an operating system of the system). Note FIG. 6, for example. As another example, where the symptom includes a pop-up window, the user input may include user selection associated with a pop-up window displayed by the system. Note FIG. 7, for example.

Figure 6:
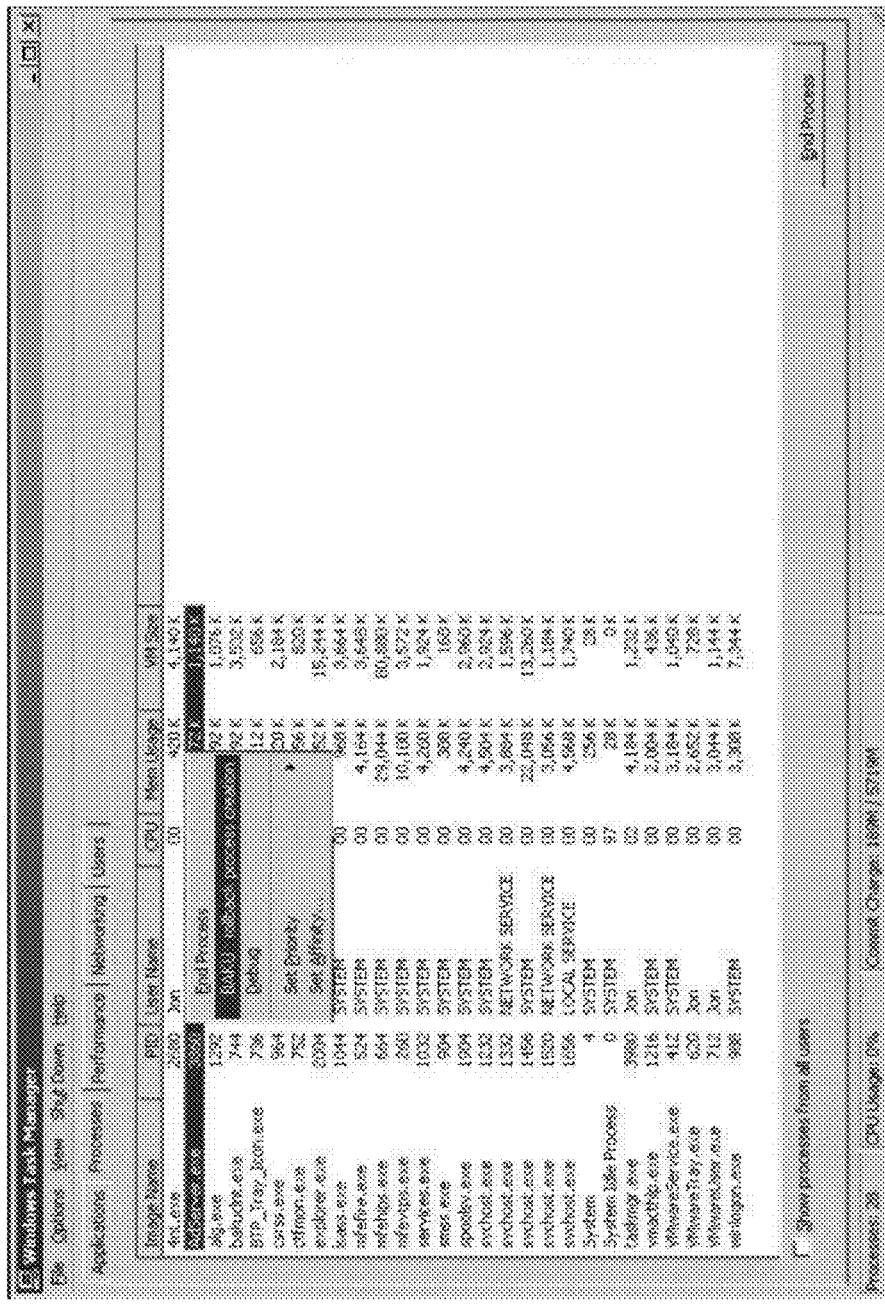
FIG. 6 shows a graphical user interface (GUI) for receiving a user selection to undo a process associated with an event identified via behavioral tracking, in accordance with another embodiment.
Figure 7:
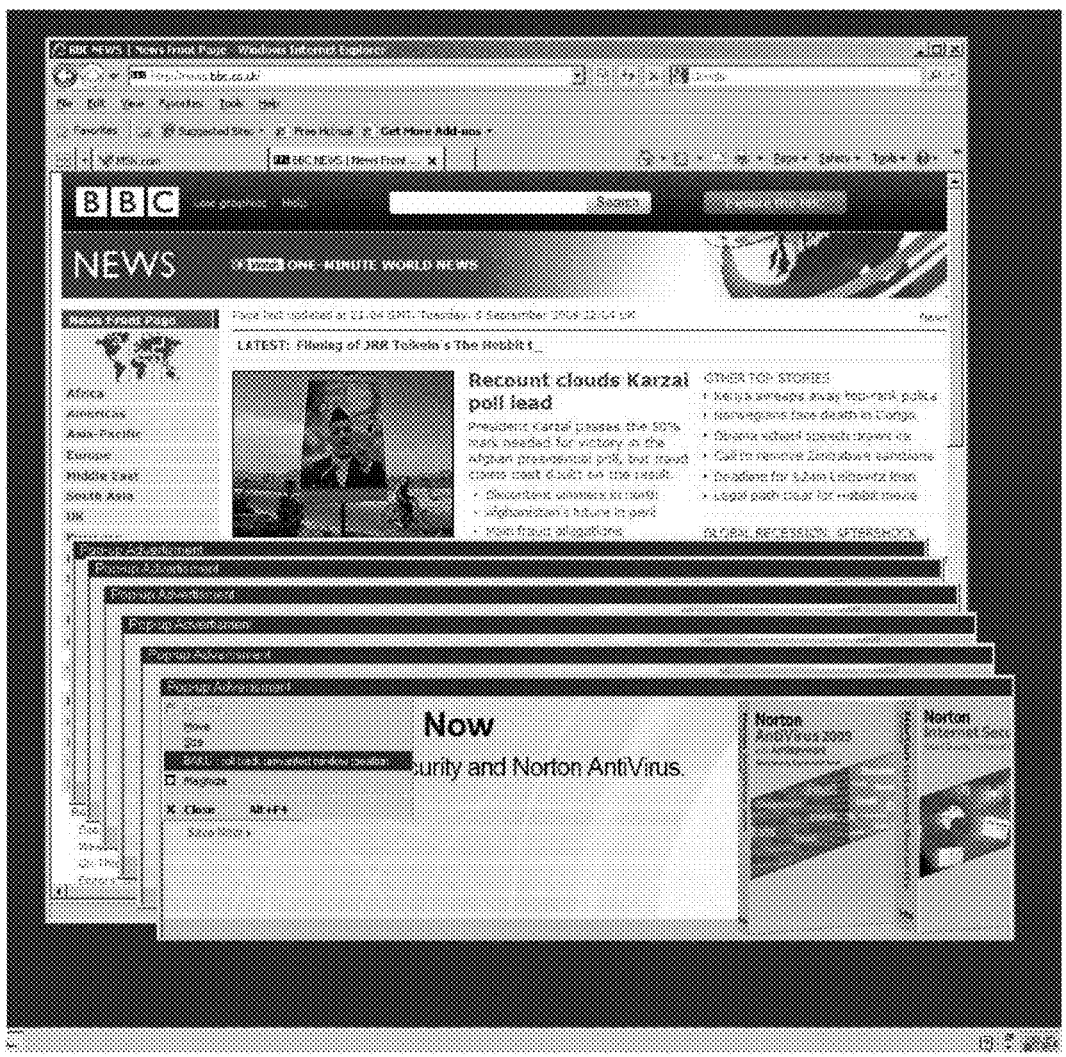
FIG. 7 shows a GUI for receiving user input to undo an event associated with an unwanted symptom on a system, in accordance with yet another embodiment.

Optionally, the user input may include selection by the user of a predefined option from a drop down menu displayed in response to selection (e.g. a right-click, etc.) of the symptom. For example, as shown in FIGS. 6 and 7, upon selection of one of the symptoms (e.g. process or pop-up window, respectively), a drop-down window may be displayed with an option to undo an event causing the symptom. Thus, with respect to such example, it may be determined whether the user has selected the option.

If it is determined that user input has not been received indicating that a symptom on the system is unwanted, the method 400 continues to wait for it to be determined user input has been received indicating that a symptom on the system is unwanted. Upon a determination that user input has been received indicating that a symptom on the system is unwanted, at least one of the tracked unclassified events that is associated with the unwanted symptom is determined. Note operation 404.

In one embodiment, at least a portion of the unclassified event(s) may be determined to be associated with the unwanted symptom by determining that such unclassified event(s) are a source of the unwanted symptom, or otherwise-contributed to the unwanted symptom. Optionally, the unclassified event(s) may be automatically determined to be associated with the unwanted symptom. Just by way of example, the unwanted symptom and/or the tracked unclassified events may be analyzed for automatically determining which are associated with the unwanted symptom.

Furthermore, as shown in operation 408, the determined event(s) is undone. Thus, in response to the determination of an event that is associated with a symptom of the system indicated by a user to be unwanted, such event may be undone. For example, the determined event may be automatically undone in response to the determination thereof. By undoing the determined event in this manner, the unwanted symptom indicated by the user input may be removed from the system.

In one exemplary embodiment, a pop-up window may be displayed to a user while accessing (e.g. viewing) a particular web page on the Internet. Behavioral tracking may track that the web page was viewed, but may not necessarily (or immediately) classify such web page access event as unwanted. Upon the user viewing the pop-up window, the user may determine that the pop-up is an unwanted symptom of the system.

Accordingly, the user may provide input associated with the pop-up window indicating that such pop-up window is unwanted. For example the user may select a predefined option in association with the pop-up window which indicates that the particular pop-up window is unwanted. In response to the user input, the web page access event causing or otherwise contributing to the display of the pop-up window may be determined (e.g. automatically), and accordingly the web page access event may be undone (e.g. thus eliminating the display or any future duplicate displays of the particular pop-up window).

Figure 5:
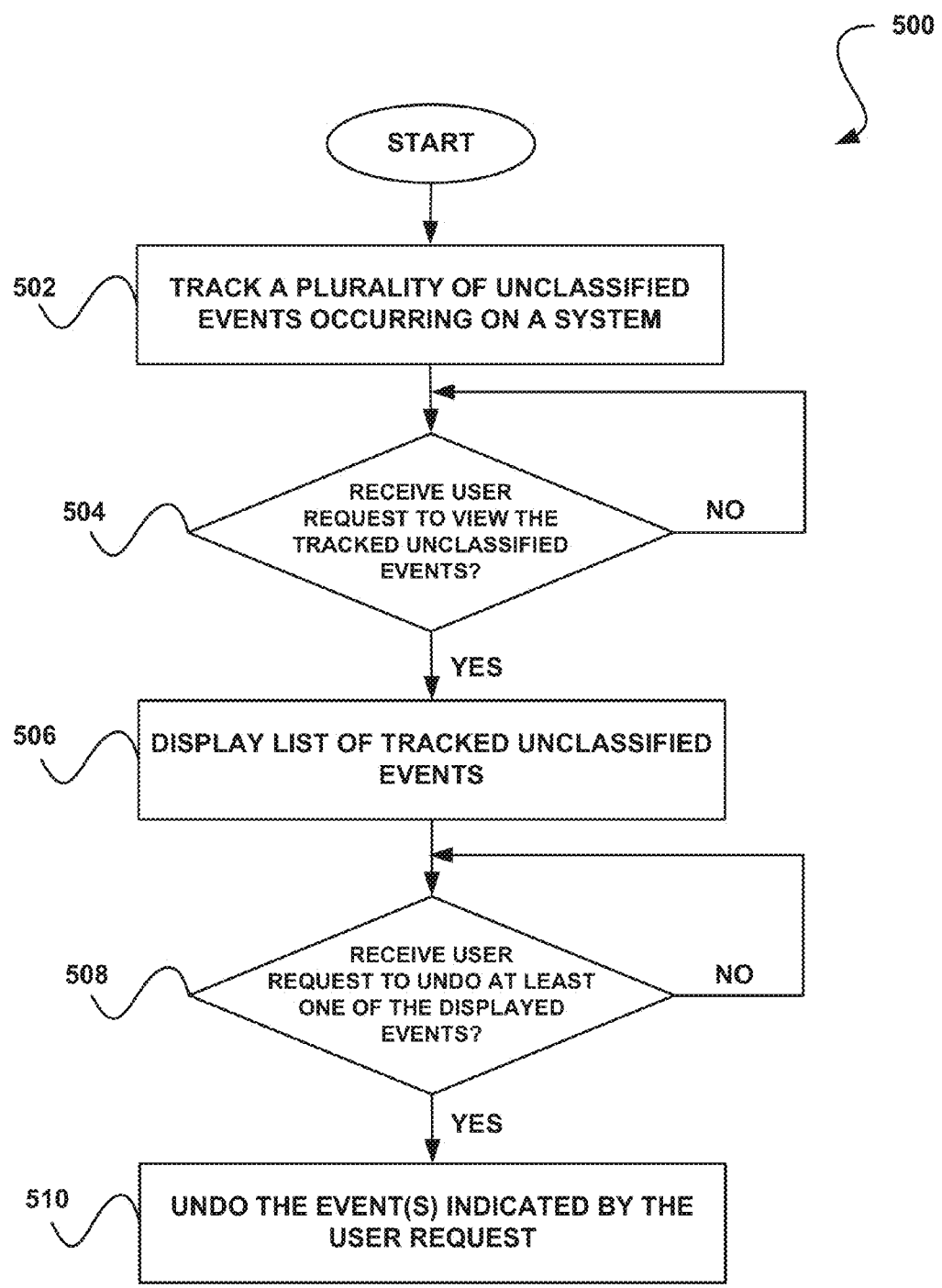
FIG. 5 shows a behavioral tracking method for undoing events selected by a user, in accordance with still yet another embodiment.

FIG. 5 shows a behavioral tracking method 500 for undoing events selected by a user, in accordance with still yet another embodiment. As an option, the method 500 may be carried out in the context of the architecture and environment of FIGS. 1-4. Of course, however, the method 500 may be carried out in any desired environment. Again, it should be noted that the aforementioned definitions may apply during the present description.

As shown in operation 502, a plurality of unclassified events occurring on a system is tracked. With respect to the present embodiment, the unclassified events are tracked utilizing behavioral tracking performed with respect to the system. For example, the unclassified events may be tracked by identifying (e.g. and logging, etc.) events occurring on the system without necessarily classifying such events.

Figure 8A:
FIGS. 8A-B show GUIs for receiving user input to undo a user selected event, in accordance with another embodiment.

Additionally, it is determined whether a user request to view the tracked unclassified events has been received. Note decision 504. In one embodiment, the user request may be received by the user selecting a predefined option from a drop down menu displayed in response to selection (e.g. a right-click, etc.) of a task bar icon on a display of the system. For example, as shown in FIG. 8A, upon selection of a task bar icon, a drop-down window may be displayed with an option to undo an event, without necessarily indicating the particular event which is to be undone. Thus, with respect to such example, it may be determined whether the user has selected the option.

If it is determined that a user request to view the tracked unclassified events has not been received, the method 500 continues to wait for such a user request to be received. However, in response to a determination that a user request to view the tracked unclassified events has been received, a list of the tracked unclassified events is displayed. Note operation 506. Optionally, the list may be limited to only unclassified events which have been tracked within a predetermined period of time (e.g. of the current time, etc.).

Figure 8B:
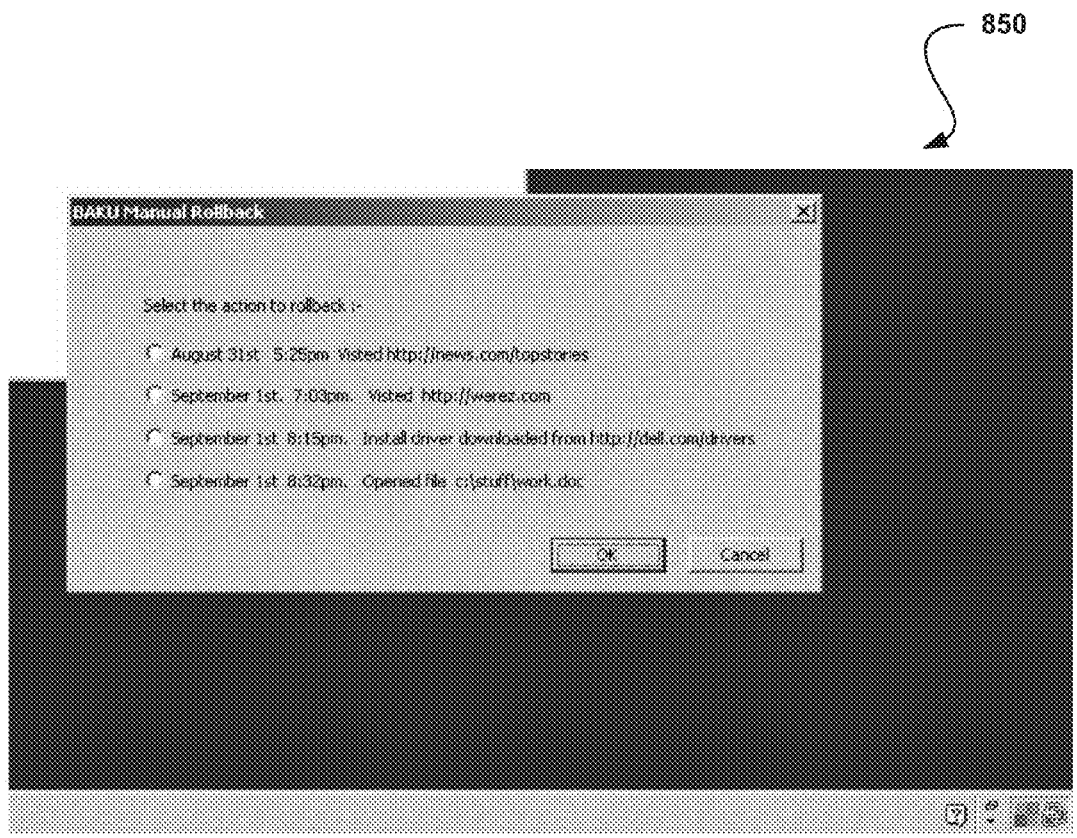

FIG. 8B shows one example of a displayed list of tracked unclassified events which may be displayed (e.g. in response to the user selection shown in FIG. 8A). Just by way of example, as shown in FIG. 8B, each of the tracked unclassified events may be displayed in the list using a date, time, and description of thereof.

It is further determined whether a user request to undo at least one of the events displayed in operation 506 has been received. Note decision 508. If it is determined that a user request to undo at least one of the displayed events has not been received, the method 500 continues to wait for such a user request to be received. Upon a determination that a user request to undo at least one of the displayed events is received, the event(s) indicated by the user request is undone, as shown in operation 510.

Thus, in response to the user selection of a particular event which has been tracked, such event may be undone. For example, the determined event may be automatically undone in response to the user selection. By undoing the selected event in this manner, the system may be placed in a state as if the event has not occurred.

In one exemplary embodiment, installation of a particular software application on the system by a user may result in an unwanted symptom occurring on the system (e.g. a reduction in a speed of a browser, etc.). The user may know that the symptom is resulting from the installation of the particular software application. In another embodiment, the user may be capable of identifying the installation of the particular software application as the cause of the symptom if presented with a list of events, one of which includes the installation of the particular software application.

Thus, behavioral tracking may track that the particular software application was installed, such that upon a request by the user to view events that occurred on the system, the installation of the particular software application may be displayed to the user as one of such events. The user may then identify the installation of the particular software application from the list, and select that such event be undone. Accordingly, the installation of the particular software application may be undone, thus removing the unwanted symptom occurring on the system as a result of the installation of the particular software application.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising instructions stored thereon that when executed, cause one or more processors to:
identify a plurality of events on a system utilizing behavioral tracking, wherein the plurality of events includes one or more classified events and one or more unclassified events;
display a list of one or more of the unclassified events of the plurality of events, that are associated with user-initiated actions;
receive user input associated with an unclassified event of the displayed list of one or more unclassified events, wherein the input includes a selection by the user associated with a symptom resulting from the at least one of the unclassified events, wherein the at least one of the unclassified events is determined to be associated with the symptom; classifying the unclassified event as an unwanted event; and
undoing the associated user-initiated action in response to receiving the input, placing the system in a state as though the associated user-initiated action had not occurred.

2. The non-transitory computer readable medium of claim 1, wherein the behavioral tracking includes analyzing behaviors of the system to identify the unclassified events.

3. The non-transitory computer readable medium of claim 1, wherein the unclassified events include at least one of accessing content and executing code.

4. The non-transitory computer readable medium of claim 1, wherein the user input includes selection of an unclassified event of the displayed list of unclassified events.

5. The non-transitory computer readable medium of claim 1, wherein the list of unclassified events include at least a portion of the unclassified events identified within a predetermined amount of time.

6. The non-transitory computer readable medium of claim 1, wherein the list of unclassified events is displayed to the user in response to a user request.

7. The non-transitory computer readable medium of claim 6, wherein the user request is received in response to the user selecting a preconfigured option from a drop down menu displayed upon selection by the user of an icon on a task bar.

8. The non-transitory computer readable medium of claim 1, wherein the symptom includes at least one pop-up window.

9. The non-transitory computer readable medium of claim 1, wherein the at least one of the unclassified events is determined to be a source of the symptom.

10. The non-transitory computer readable medium of claim 1, wherein the at least one of the unclassified events is automatically determined to be associated with the symptom.

11. The non-transitory computer readable medium of claim 1, wherein the at least one of the unclassified events is manually determined to be associated with the symptom.

12. The non-transitory computer readable medium of claim 1, wherein the at least one of the unclassified events associated with the input is automatically classified as an unwanted event.

13. The non-transitory computer readable medium of claim 1, wherein the at least one of the unclassified events associated with the input is manually classified as an unwanted event.

14. A method, comprising:
identifying, by a processor, a plurality of events on a system utilizing behavioral tracking, wherein the plurality of events includes one or more classified events and one or more unclassified events;
displaying a list of one or more of the unclassified events of the plurality of events that are associated with user-initiated actions;

receiving, by the processor, user input associated an unclassified event of the displayed list of one or more unclassified events, wherein the input includes a selection by the user associated with a symptom resulting from the at least one of the unclassified events, wherein the at least one of the unclassified events is determined to be associated with the symptom;

classifying the unclassified event as an unwanted event; and undoing, by the processor, the associated user-initiated action in response to receiving the user input, placing the system in a state as though the user-initiated action had not occurred.

15. A system, comprising:

a processor;

a memory, coupled to the processor, on which are stored instructions, comprising instructions that when executed cause the processor to:

identify a plurality of events on a system utilizing behavioral tracking, wherein the plurality of events includes one or more classified events and one or more unclassified events;

display a list of one or more of the unclassified events of the plurality of events-that are associated with user-initiated actions;

receive user input associated with an unclassified event of the displayed list of one or more unclassified events, wherein the input includes a selection by the user associated with a symptom resulting from the at least one of the unclassified events, wherein the at least one of the unclassified events is determined to be associated with the symptom;

classify the unclassified event as an unwanted event; and undo the associated user-initiated action in response to the receipt of the input, placing the system in a state as though the user-initiated action had not occurred.

16. The method of claim 14, wherein the user input includes a selection by the user associated with a symptom resulting from the at least one of the unclassified events, wherein the at least one of the unclassified events is manually determined to be associated with the symptom.

17. The system of claim 15, wherein the input includes a selection by the user associated with a symptom resulting from the at least one of the unclassified events, wherein the at least one of the unclassified events is manually determined to be associated with the symptom.

* * * * *